(12) United States Patent
Bodziony et al.

(10) Patent No.: US 11,709,935 B2
(45) Date of Patent: Jul. 25, 2023

(54) DETECTING POTENTIALLY MALICIOUS CODE IN DATA THROUGH DATA PROFILING WITH AN INFORMATION ANALYZER

(71) Applicant: International Business Machines Corporation, Armonk, NY (US)

(72) Inventors: Michal Bodziony, Tegoborze (PL); Bartosz Tomasik, Cracow (PL); Tomasz Zatorski, Cracow (PL); Marcin Filip, Cracow (PL); Marcin Luczynski, Cracow (PL); Wojciech Mis, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/213,829

(22) Filed: Mar. 26, 2021

(65) Prior Publication Data

US 2022/0309159 A1 Sep. 29, 2022

(51) Int. Cl.
*G06F 21/56* (2013.01)
*G06F 21/60* (2013.01)
*G06F 21/51* (2013.01)

(52) U.S. Cl.
CPC ............ *G06F 21/562* (2013.01); *G06F 21/51* (2013.01); *G06F 21/568* (2013.01); *G06F 21/60* (2013.01)

(58) Field of Classification Search
CPC ...... G06F 21/562; G06F 21/51; G06F 21/568; G06F 21/60; G06F 21/561
See application file for complete search history.

(56) References Cited

U.S. PATENT DOCUMENTS

| | | | |
|---|---|---|---|
| 9,235,704 B2 * | 1/2016 | Wootton | ................. H04W 4/00 |
| 10,693,900 B2 | 6/2020 | Zadeh | |
| 10,701,091 B1 | 6/2020 | Cunningham | |
| 2012/0110174 A1 * | 5/2012 | Wootton | ............. H04L 63/1416 |
| | | | 709/224 |
| 2017/0063901 A1 | 3/2017 | Muddu | |
| 2019/0081876 A1 | 3/2019 | Ghare | |
| 2019/0354680 A1 * | 11/2019 | De Lima Junior | ... G06F 21/566 |
| 2023/0059796 A1 * | 2/2023 | Seletskiy | .............. G06F 21/554 |

* cited by examiner

*Primary Examiner* — J. Brant Murphy
(74) *Attorney, Agent, or Firm* — Stephen R. Yoder

(57) ABSTRACT

Utilizing an Information Analyzer to profile data in order to identify data assets that contain executable code for the purpose of ensuring the security and integrity of the profiled data. The results of the data profiling process can be used by security policies to reduce the risks of malicious code execution attacks.

12 Claims, 3 Drawing Sheets

250

DETECTING POTENTIALLY MALICIOUS CODE IN DATA THROUGH DATA PROFILING WITH AN INFORMATION ANALYZER

BACKGROUND

The present invention relates generally to the field of data processing, and more particularly to using data profiling methods for processing certain types of complex, enterprise-level data that come from a variety of sources.

As used herein in this document, the terms "malicious code" and "malware" are used interchangeably. The Wikipedia entry for "malware" (as of Jan. 5, 2020) states as follows: "Malware . . . is any software intentionally designed to cause damage to a computer, server, client, or computer network . . . A wide variety of malware types exist, including computer viruses, worms, Trojan horses, ransomware, spyware, adware, rogue software, wiper and scareware. Programs are also considered malware if they secretly act against the interests of the computer user."

The Wikipedia entry for "data profiling" (as of Jan. 5, 2020) states as follows: "Data profiling is the process of examining the data available from an existing information source (e.g. a database or a file) and collecting statistics or informative summaries about that data . . . The purpose of these statistics may be to: [1] Find out whether existing data can be easily used for other purposes . . . [2] Improve the ability to search data by tagging it with keywords, descriptions, or assigning it to a category . . . [3] Assess data quality, including whether the data conforms to particular standards or patterns . . . [4] Assess the risk involved in integrating data in new applications, including the challenges of joins . . . [5] Discover metadata of the source database, including value patterns and distributions, key candidates, foreign-key candidates, and functional dependencies . . . [6] Assess whether known metadata accurately describes the actual values in the source database . . . [7] Understanding data challenges early in any data intensive project, so that late project surprises are avoided. Finding data problems late in the project can lead to delays and cost overruns . . . [and 8] Have an enterprise view of all data, for uses such as master data management, where key data is needed, or data governance for improving data quality."

SUMMARY

According to an aspect of the present invention, there is a method, computer program product and/or system that performs the following operations (not necessarily in the following order): (i) loading a set of extracted data into a database; (ii) profiling the set of extracted data according to a set of data classification criteria; (iii) responsive to the profiling of the set of extracted data, determining that the set of extracted data includes a set of executable code; (iv) determining that the set of executable code violates a security policy; (v) transforming the extracted data in preparation for loading at a destination, with the transformation including neutralizing the set of executable code to obtain a set of transformed data; and (vi) loading the transformed data at the destination.

DETAILED DESCRIPTION

Figure 1:
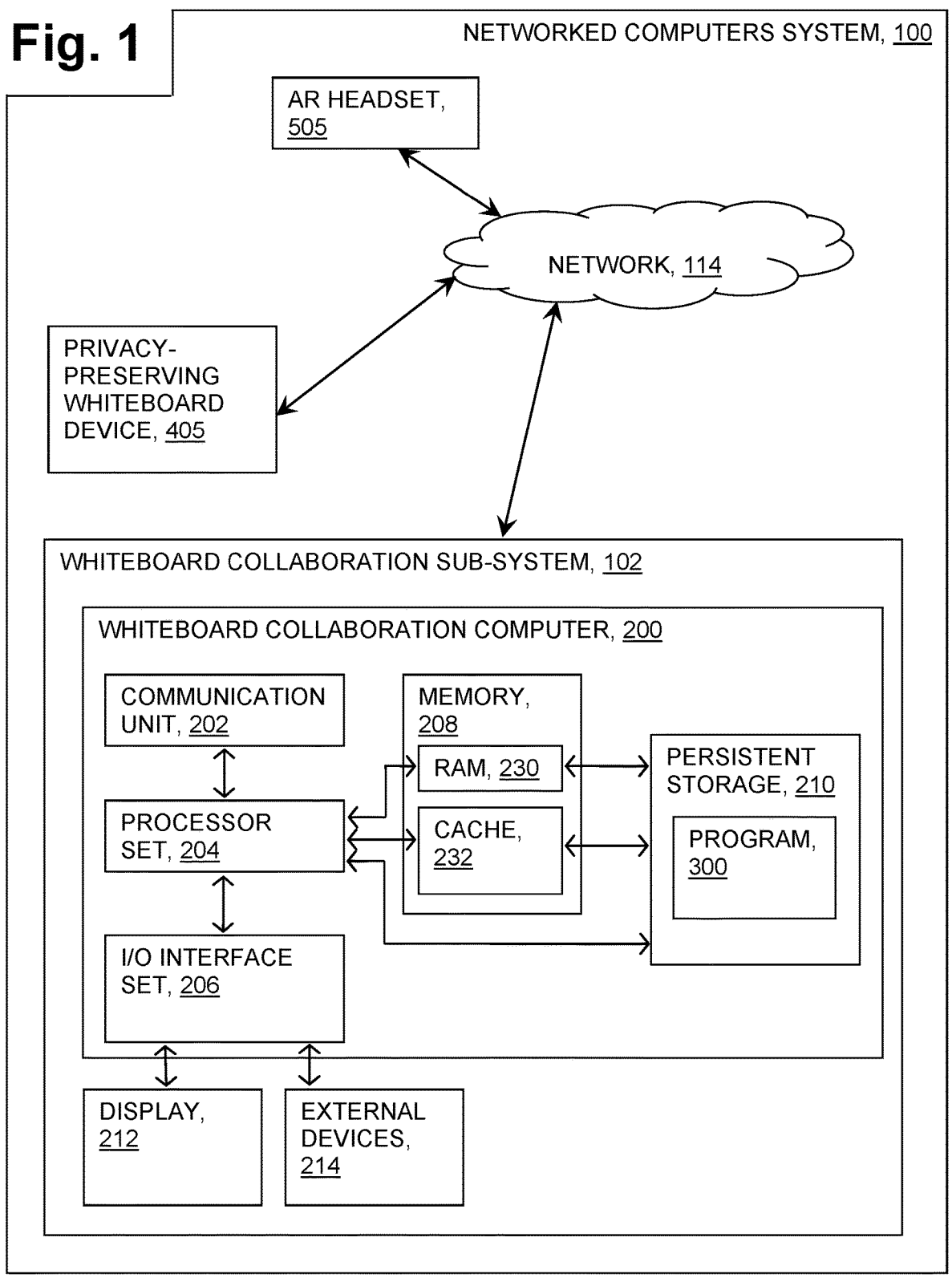
FIG. 1 is a block diagram view of a first embodiment of a system according to the present invention.

Some embodiments of the present invention are directed towards utilizing an Information Analyzer to profile data in order to identify data assets that contain executable code for the purpose of ensuring the security and integrity of the profiled data. The results of the data profiling process can be used by security policies to reduce the risks of malicious code execution attacks.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
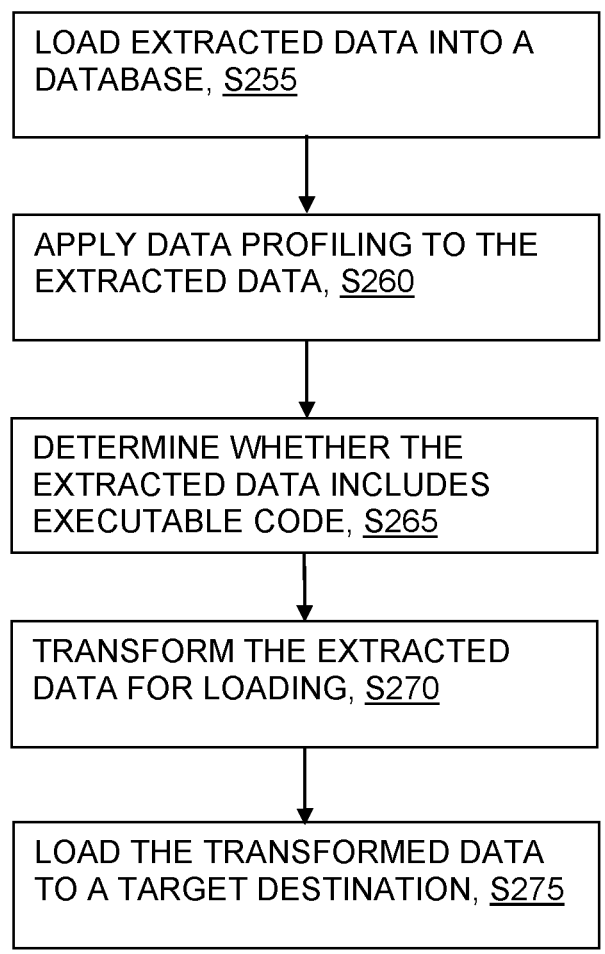
FIG. 2 is a flowchart showing a first embodiment method performed, at least in part, by the first embodiment system.
Figure 3:
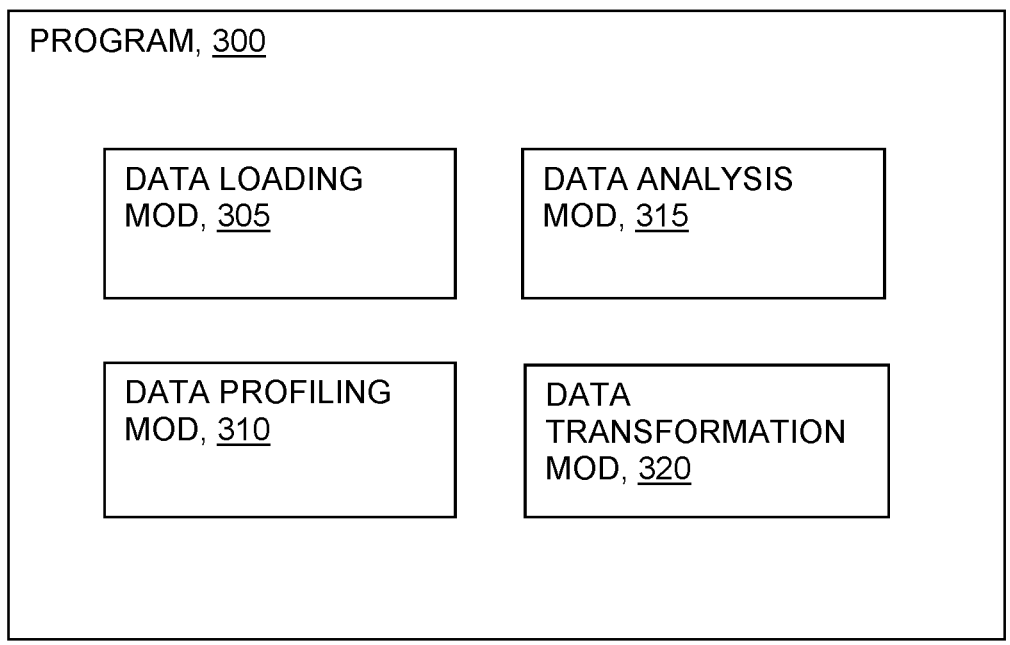
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where data loading module ("mod") 305 loads a set of extracted data into a database. In some embodiments of the present invention, this extracted data includes the following types of data: structured, semi-structured, unstructured and data pertaining to any discipline. In some embodiments of the present invention, there are implementations for structured data as well as semi-structured and unstructured data.

In particular, engineering data typically contains embedded "executable sources" (from logs, data from source code repositories, technical documentations, data relating to IoT). However, even non-technical data can contain fragments of HTML code, executable macros in spreadsheets and the like.

Processing proceeds to operation S260, where data profiling mod 310 applies data profiling techniques to the set of extracted data (as discussed above in connection with operation S255, above).

Processing proceeds to operation S265, where data analysis mod 315 analyses the set of extracted data (as discussed above in connection with operation S255, above) to determine whether this extracted data set includes executable code.

Processing proceeds to operation S270, where data transformation mod 320 transforms the extracted data so that this data can be loaded at a target destination (such as a second database that can utilize the extracted data for a specific purpose).

Processing proceeds to operation S275, where data loading mod 305 loads the transformed data (as discussed above in connection with operation S270, above) at the target destination.

III. Further Comments and/or Embodiments

Some embodiments of the present invention recognize the following facts, potential problems and/or potential areas for improvement with respect to the current state of the art: (i) processing of data from variety of sources introduces a risk of injecting malicious data; (ii) in many cases data processing is implemented in the way that malicious data can be interpreted as code and executed on a target system (known as malicious code); (iii) this is because of an imperfect implementation; (iv) malicious code is the kind of harmful computer code or web script designed to create system vulnerabilities leading to back doors, security breaches, information and data theft, and other potential damages to files and computing systems; and (v) it is a type of threat that typically may not be blocked by an antivirus software on its own.

Some embodiments of the present invention recognize the following facts, potential problems and/or potential areas for improvement with respect to the current state of the art: (i) one example of such a security attack (described in the preceding paragraph, above) is reflected in cross site scripting; (ii) reflected cross-site scripting (or XSS) arises when an application receives data in a hypertext transfer protocol (HTTP) request and includes that data within the subsequent response in an unsafe way; (iii) in this scenario, the malicious script can be injected by a HTTP request or by any other data flow (data integration means; (iv) another example of malicious data attack can be putting malicious code into data which is then exported into csv format in order to be imported to Microsoft Excel; and (v) in this case, the malicious code can be a VBA macro which is executed on the workstation of the target.

Some embodiments of the present invention recognize the following facts, potential problems and/or potential areas for improvement with respect to the current state of the art: (i) in the landscape of plurality of data source types, processing engines, and used languages it is a challenge to ensure that our data does not contain any malicious code; (ii) neutralization of exported data is a big project if one takes into consideration all the languages which could be used; (iii) for example, if data is unloaded to CSV files it is unknown how data will be used later on and at a design phase; (iv) it is difficult to decide what kind of escaping or neutralization methods to apply.

Some embodiments of the present invention may include one, or more, of the following features, characteristics and/or advantages: (i) uses data profiling; (ii) the data profiling process includes multiple analyses that investigate the structure and content of a given user's data and makes inferences about that data; (ii) after the analysis is complete, a given user can review the results and accept or reject the inferences; (iii) the data profiling process includes multiple analyses that work together to evaluate the data; (iv) data profiling, in some cases, focuses on domain analysis, data classification, format analysis, correlation, etc.; (v) the information collected in the profiling phase can be used later on to execute data processing related policies; (vi) these data processing related policies include, for example, "data classified as Personal Identity Information are forbidden to be exported to countries outside of European Union."

Some embodiments of the present invention include a novel capability referred to as Information Analyzer to profile data from security point of view in order to identify data assets that contain executable code. Results of such data profiling from the Information Analyzer can be used by security policies and/or protocols to reduce risks of malicious code execution attacks. In some embodiments, the Information Analyzer solution is designed to focus on the following: (i) security focused data profiling; and (ii) enforcement of security policies based on the data profiling results.

Additionally, in some embodiments, the Information Analyzer solution includes the following components: (i) code detection classifiers; (ii) profiling engine; (iii) policy registry; (iv) policy enforcing component; (v) ETL/DI (data integration) engine; and (vi) applications that utilize ETL/DI. Each of these components will now be described in further detail below.

Solution components:

With respect to the first component, the code detection classifiers are a set of plugins/executable programs that are able to scan data and identify the subset of scanned data in executable code. One example of such classifier can be JavaScript code classifier or VBA macros classifier. The result of this data profiling can take on the form of a statistical summary about the profiled data. For example, the summary can produce the following information: 0% of data is a Groovy code, 0.1% of data contains JavaScript, 2/10M records contain VBA macros.

With respect to the second component, the profiling engine is an engine that orchestrates profiling utilizing full set of classifiers from (A), it is responsibility is to ensure high performance parallel profiling, collect results and persist it in metadata catalog.

With respect to the third component, the policies registry is a registry of security rules combined into policies. Example of such policy can be a policy which prevents data export to a CSV file in case when data contains potentially malicious code for Excel or other. Such a policy can contain rules, like "if data contains at least 1 record of VBA code then prohibit export/unloads", the other example can be "if data contains more than 20% of regular expression formulas then remove/neutralize the formulas in order to prevent DoS".

With respect to the fourth component, the policies enforcing component is a set of program rules to enforce policies on a Data Integration (DI) engine. With respect to the fifth component, the ETL/DI engine is a software module that is responsible for execution of a set of defined data flows, ETLs, etc. Typically, the ETL/DI engine is also used with multimode parallel engines (DataStage PX, Spark etc.). Finally, with respect to the sixth component, applications that utilize the ETL/DI engine can be any application which uses ETL/DI jobs to conduct exports, data imports or any other data flows.

Certain types of users that carry out the operations of certain embodiments of the present invention include data stewards, security officers, ETL operators, ETL developers, and data engineers.

To understand how these types of users perform operations of the present invention, consider the following end-to-end scenario: (i) data engineer loads the data into the database; (ii) data engineer catalogs loaded data assets (alternatively it is done by automatic discovery process); (iii) data steward ensures data profiling (including identification/classification of data containing, machine executable code); (iv) profiling engine runs plurality of code detection classifiers; (v) profiling collects results to be accepted by Data steward; (vi) data steward reviews and accepts/rejects/modifies profiling findings; (vii) optionally, a data Steward initiates process of neutralization of potentially malicious data (removal/escaping/etc.); (viii) security officer defines policies related to processing of malicious data; (ix) ETL operator executes defined data integration job. (Alternative step: external application trigger ETL job to export/import/transform data); and (x) policies enforcing component verify job to be executed and enforce actions in case of matching rules. For example: reject job execution, suspend job execution, enforce escaping/neutralization.

In some embodiments of the present invention, generalization techniques can be implemented. This includes using data profiling methods to detect command lines, HTTP requests, functions, and parameters (such as filtering criteria). Additionally, enhancement techniques can be used to achieve a more granular classification system. This includes operations such as: distinguishing DML from DDL in case of SQLs, distinguishing read only operations from read/write operations, and other semantic analysis operations. Finally, in some embodiments of the present invention, different types of actions in rules can be added, such as blocking, suspending, neutralizing data, and notifications.

Some embodiments of the present invention provide a method for detecting and neutralizing malicious code that is embedded in data within an ETL (extract, transform, and load) environment. This method includes the following operations (not necessarily in the following order): (i) loading a set of extracted data into a database; (ii) profiling the set of extracted data according to a set of data classification criteria; (iii) determining, according to the profiling, the set of extracted data includes a set of executable code; (iv) determining the set of executable code violates a security policy; (v) transforming the extracted data in preparation for loading at a destination, wherein the transforming includes neutralizing the set of executable code; (vi) loading the transformed, extracted data at the destination; and (vii) notifying a user of the loading and the neutralized set of executable code.

In some embodiments of the present invention, examples of security policy rules include the following: (1) IF source data_format is csv AND destination_format is xls THEN neutralize visual basic macros; (2) IF source database is code repository AND destination database is documentation repository THEN neutralize all code; and (3) IF source data is customer_complains table AND data contains any code THEN reject processing.

Security policies can be tailored to support a variety of implementations. This can include policies that protect data integration processing engines, policies that protect destination data sources, policies that protect end consumers of the data, and policies that identify malicious code at a given source (this can be used for security scanning of data sources without the intention of additional processing).

In some aspects of this method, neutralizing the set of executable code includes at least the following: (i) deleting the set of executable code and/or (ii) transforming the set of executable code into a set of text that is not machine readable. Additionally, in some embodiments, the set of text that is not machine readable is moved to a metadata annotation to the set of transformed, extracted data.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
loading a set of extracted data into a database;
profiling the set of extracted data according to a set of data classification criteria;

responsive to the profiling of the set of extracted data, determining the set of extracted data includes a set of executable code;

determining the set of executable code violates a security policy;

transforming the extracted data by neutralizing the set of executable code in the set of extracted data, the neutralizing including transforming the set of executable code into a set of text, the set of text not being machine readable; and loading the transformed set of extracted data at a destination.

2. The CIM of claim 1 further comprising:

notifying a user that the set of executable code has been loaded and neutralized and the transformed set of extracted data is loaded at the destination.

3. The CIM of claim 1 wherein the set of text is moved to a metadata annotation in the transformed set of extracted data.

4. The CIM of claim 1 wherein the security policy includes a rule to protect data integration processing engines.

5. A computer program product (CPP) comprising:

a machine readable storage device; and computer code stored on the machine readable storage device, with the computer code including instructions and data for causing a processor(s) set to perform operations including the following:

loading a set of extracted data into a database, profiling the set of extracted data according to a set of data classification criteria;

responsive to the profiling of the set of extracted data, determining the set of extracted data includes a set of executable code;

determining the set of executable code violates a security policy;

transforming the extracted data by neutralizing the set of executable code in the set of extracted data, the neutralizing including transforming the set of executable code into a set of text, the set of text not being machine readable; and loading the transformed set of extracted data at a destination.

6. The CPP of claim 5 further comprising:

notifying a user that the set of executable code has been neutralized and the transformed set of extracted data is loaded at the destination.

7. The CPP of claim 5 wherein the set of text is moved to a metadata annotation in the transformed set of extracted data.

8. The CPP of claim 5 wherein the security policy includes a rule to protect data integration processing engines.

9. A computer system (CS) comprising:

a processor set;

a machine readable storage device; and computer code stored on the machine readable storage device, with the computer code including instructions and data for causing a processor set to perform operations including the following:

loading a set of extracted data into a database, profiling the set of extracted data according to a set of data classification criteria;

responsive to the profiling of the set of extracted data, determining the set of extracted data includes a set of executable code;

determining the set of executable code violates a security policy;

transforming the extracted data by neutralizing the set of executable code in the set of extracted data, the neutralizing including transforming the set of executable code into a set of text, the set of text not being machine readable; and loading the transformed set of extracted data at a destination.

10. The CS of claim 9 further comprising:

notifying a user that the set of executable code has been neutralized and the transformed set of extracted data is loaded at the destination.

11. The CS of claim 9 wherein the set of text is moved to a metadata annotation in the transformed set of extracted data.

12. The CS of claim 9 wherein the security policy includes a rule to protect data integration processing engines.

* * * * *